US010183344B2

(12) United States Patent
Timmons et al.

(10) Patent No.: US 10,183,344 B2
(45) Date of Patent: *Jan. 22, 2019

(54) PILOT PIN FOR DRILL PRESS

(71) Applicant: MILWAUKEE ELECTRIC TOOL CORPORATION, Brookfield, WI (US)

(72) Inventors: Terry L. Timmons, Milwaukee, WI (US); Andrew M. Plowman, Wauwatosa, WI (US); Brian Alves, Milwaukee, WI (US)

(73) Assignee: MILWAUKEE ELECTRIC TOOL CORPORATION, Brookfield, WI (US)

(*) Notice: Subject to any disclaimer, the term of this patent is extended or adjusted under 35 U.S.C. 154(b) by 0 days.

This patent is subject to a terminal disclaimer.

(21) Appl. No.: 15/838,853

(22) Filed: Dec. 12, 2017

(65) Prior Publication Data

US 2018/0099338 A1    Apr. 12, 2018

Related U.S. Application Data

(63) Continuation of application No. 15/032,721, filed as application No. PCT/US2014/062376 on Oct. 27, 2014, now Pat. No. 9,873,156.

(60) Provisional application No. 61/898,772, filed on Nov. 1, 2013.

(51) Int. Cl.
| B23B 51/00 | (2006.01) |
| B23B 51/04 | (2006.01) |
| B23B 47/26 | (2006.01) |
| B23Q 9/00 | (2006.01) |
| B25H 1/00 | (2006.01) |

(52) U.S. Cl.
CPC .......... *B23B 51/0426* (2013.01); *B23B 47/26* (2013.01); *B23Q 9/0007* (2013.01); *B25H 1/0071* (2013.01); *B23B 51/0453* (2013.01); *B23B 2251/603* (2013.01); *B23B 2260/136* (2013.01); *Y10T 408/895* (2015.01)

(58) Field of Classification Search
CPC ............ B23B 51/0426; B23B 51/0453; B23B 2251/603; B23Q 9/0007; B25H 1/0071; Y10T 408/895; Y10T 408/896
See application file for complete search history.

(56) References Cited

U.S. PATENT DOCUMENTS

| 1,331,189 A | 2/1920 | Farrell |
| 1,365,660 A | 1/1921 | Collier |
| 2,484,150 A | 10/1949 | Brown |
| 2,484,801 A | 10/1949 | Anderson |
| 3,075,294 A | 1/1963 | Strecker |

(Continued)

FOREIGN PATENT DOCUMENTS

GB    2085767    5/1982

OTHER PUBLICATIONS

US 6,012,879, 01/2000, Uehlein-Proctor (withdrawn)

(Continued)

*Primary Examiner* — Daniel Howell
*Assistant Examiner* — Yasir Diab
(74) *Attorney, Agent, or Firm* — Michael Best & Friedrich LLP

(57) ABSTRACT

A pilot pin assembly is slidably receivable within a tool bit of a drill press. The pilot pin assembly includes a first pin defining an interior cavity, and a second pin at least partially received within the interior cavity of the first pin. A spring is positioned within the interior cavity for biasing the second pin toward an extended position relative to the first pin.

17 Claims, 5 Drawing Sheets

(56) References Cited

U.S. PATENT DOCUMENTS

| | | | |
|---|---|---|---|
| 3,456,532 | A | 7/1969 | Hougen |
| 3,825,362 | A | 7/1974 | Hougen |
| 4,129,400 | A | 12/1978 | Wozar |
| 4,131,384 | A | 12/1978 | Hougen |
| 4,193,721 | A | 3/1980 | Hougen |
| 4,261,673 | A | 4/1981 | Hougen |
| 4,447,956 | A | 5/1984 | Chung |
| 4,664,565 | A | 5/1987 | Palm |
| 4,770,569 | A | 9/1988 | Ooki et al. |
| 5,062,748 | A | 11/1991 | Kishida |
| 5,316,418 | A | 5/1994 | Miyanaga |
| 5,447,397 | A | 9/1995 | Asano |
| 6,102,633 | A | 5/2000 | Uehlein-Proctor |
| 7,001,117 | B2 | 2/2006 | Mikiya et al. |
| 7,494,306 | B2 | 2/2009 | Shimada |
| 7,862,267 | B2 | 1/2011 | Shimada |
| 2003/0213621 | A1 | 11/2003 | Britten et al. |
| 2004/0218988 | A1 | 11/2004 | Cantlon |
| 2007/0231090 | A1 | 10/2007 | Sherry |
| 2008/0008547 | A1 | 1/2008 | Hidaka |
| 2008/0286063 | A1 | 11/2008 | Shimada |
| 2010/0196112 | A1 | 5/2010 | Bum |
| 2010/0278601 | A1 | 11/2010 | Beynon |
| 2011/0318122 | A1 | 12/2011 | Montplaisir et al. |
| 2012/0163933 | A1 | 1/2012 | Richt et al. |
| 2013/0287508 | A1 | 10/2013 | Timmons et al. |

OTHER PUBLICATIONS

Milwaukee Tool, "Operator's Manual for Catalog No. 4270-20 Compact Electromagnetic Drill Press" downloaded from the web site <https://documents.milwaukeetool.com/58-14-4270d7.pdf> on Oct. 22, 2013 (15 pages).

Milwaukee Tool, "Service Parts List for Catalog No. 4270-20 Mag Stand Assembly" downloaded from the web site <https://documents.milwaukeetool.com/54-46-0400.pdf> on Oct. 22, 2013 (4 pages).

International Search Report and Written Opinion for Application No. PCT/US2014/062376 dated Feb. 3, 2015 (8 pages).

PILOT PIN FOR DRILL PRESS

CROSS-REFERENCE TO RELATED APPLICATIONS

This application is a continuation of U.S. patent application Ser. No. 15/032,721 filed on Apr. 28, 2016, which is a national stage patent application of International Patent Application No. PCT/US2014/062376 filed on Oct. 27, 2014, which claims priority to U.S. Provisional Patent Application No. 61/898,772 filed on Nov. 1, 2013, the entire contents of which are all incorporated herein by reference.

FIELD OF THE INVENTION

The present invention relates to pilot pins, and more specifically to pilot pins for use with drill presses.

BACKGROUND OF THE INVENTION

Magnetic drill presses perform drilling operations by latching a magnetic base of the drill press to a ferromagnetic workpiece. Such magnetic bases use electromagnets or permanent magnets for generating a magnetic field. Before latching the magnetic base to the workpiece, the user aligns the drill press with the workpiece and attempts to ensure that a drill bit supported by the drill press will intersect the workpiece at a desired location on the workpiece. However, alignment of the drill press can be a matter of trial-and-error which takes time and does not always ensure the drill bit will intersect the workpiece at the desired location.

SUMMARY OF THE INVENTION

The invention provides, in one aspect, a pilot pin assembly slidably receivable within a tool bit of a drill press. The pilot pin assembly includes a first pin defining an interior cavity, and a second pin at least partially received within the interior cavity of the first pin. A spring is positioned within the interior cavity for biasing the second pin toward an extended position relative to the first pin.

The invention provides, in another aspect, a magnetic drill press operable to perform work on a workpiece with a tool bit. The magnetic drill press includes a base attachable to the workpiece, a housing supported by the base, and a motor positioned within the housing. The magnetic drill press further includes a spindle coupled to the motor for rotation about a rotational axis, and the tool bit is attachable to the spindle for co-rotation therewith. A pilot pin assembly at least partially extends through the tool bit for providing an indication where the rotational axis intersects the workpiece. The pilot pin assembly includes a first pin and a second pin telescopically received within the first pin.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
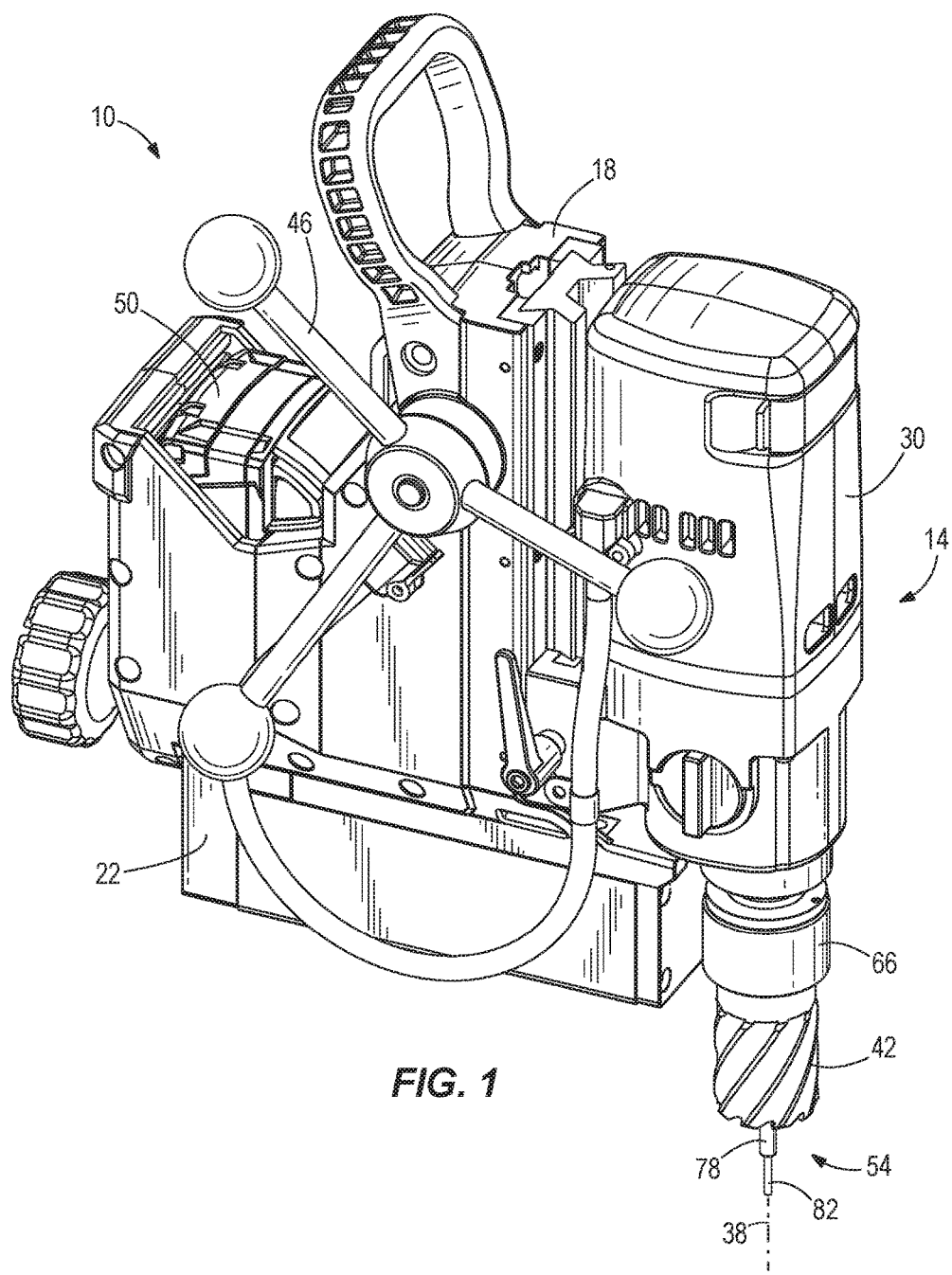
FIG. 1 is a perspective view of a magnetic drill press including a pilot pin assembly in accordance with an embodiment of the invention.
Figure 2:
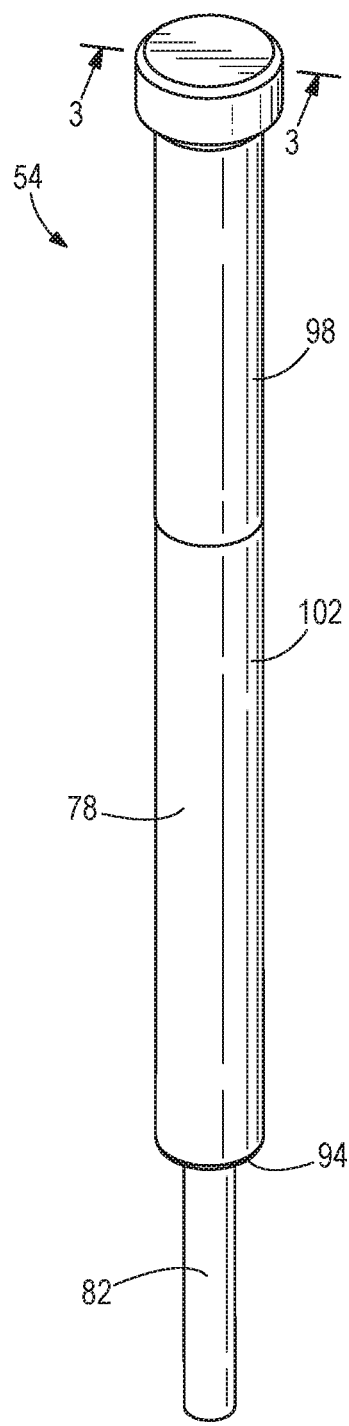
FIG. 2 is a perspective view of the pilot pin assembly of FIG. 1.
Figure 3:
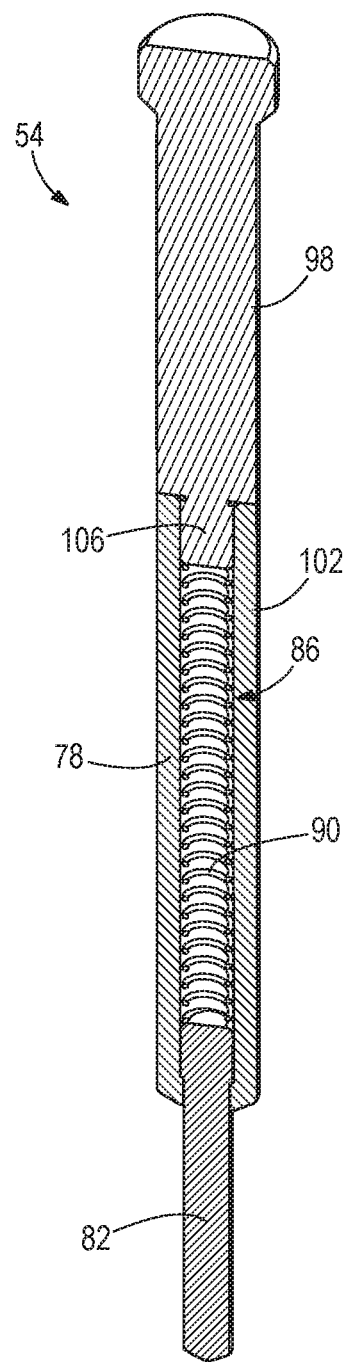
FIG. 3 is a cross-sectional view of the pilot pin assembly of FIG. 2.
Figure 4:
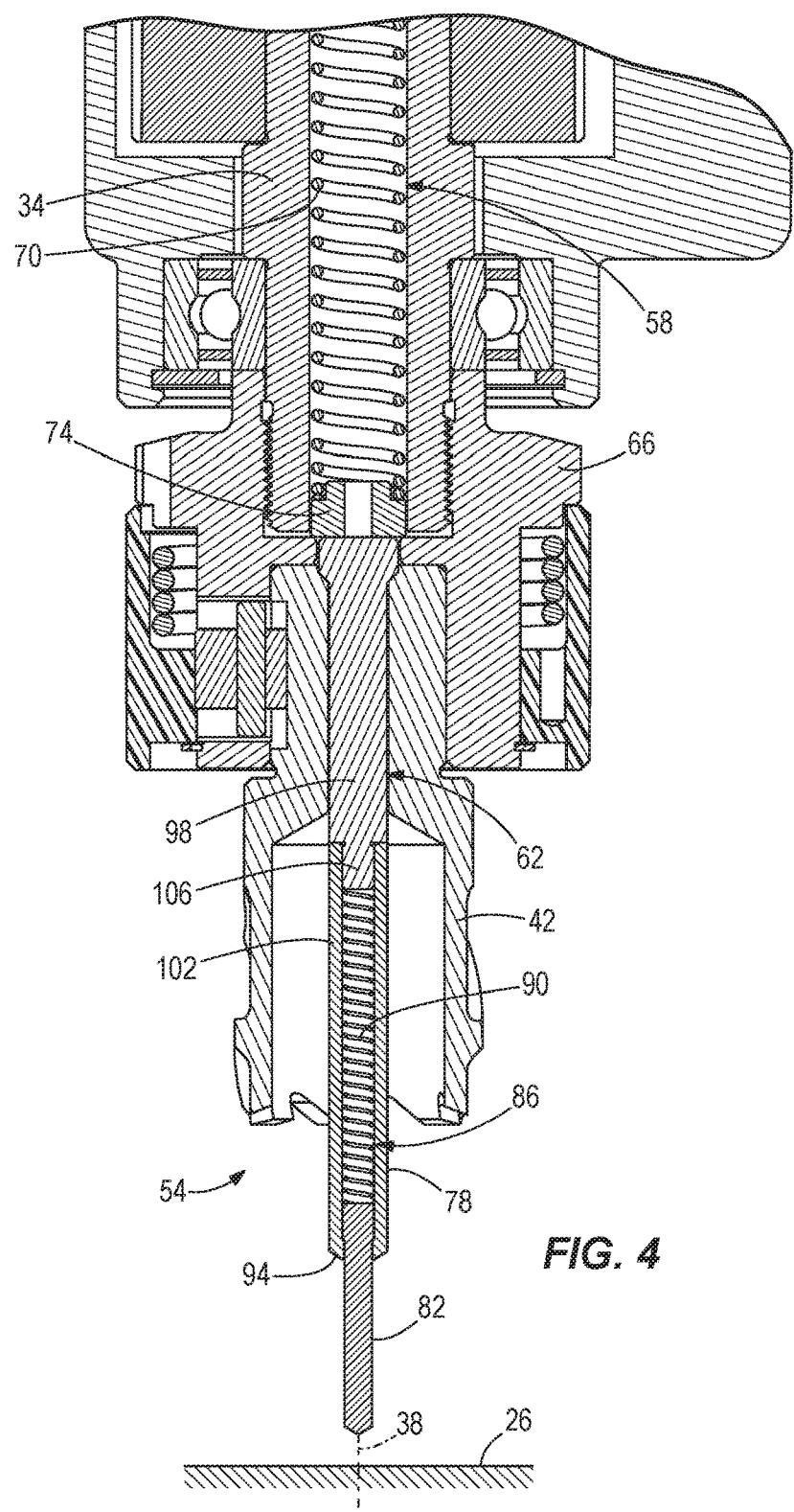
FIG. 4 is a partial cross-sectional view of the magnetic drill press and pilot pin assembly of FIG. 1, illustrating a first pin in an extended position relative to a drill bit and a second pin in an extended position relative to the first pin.
Figure 5:
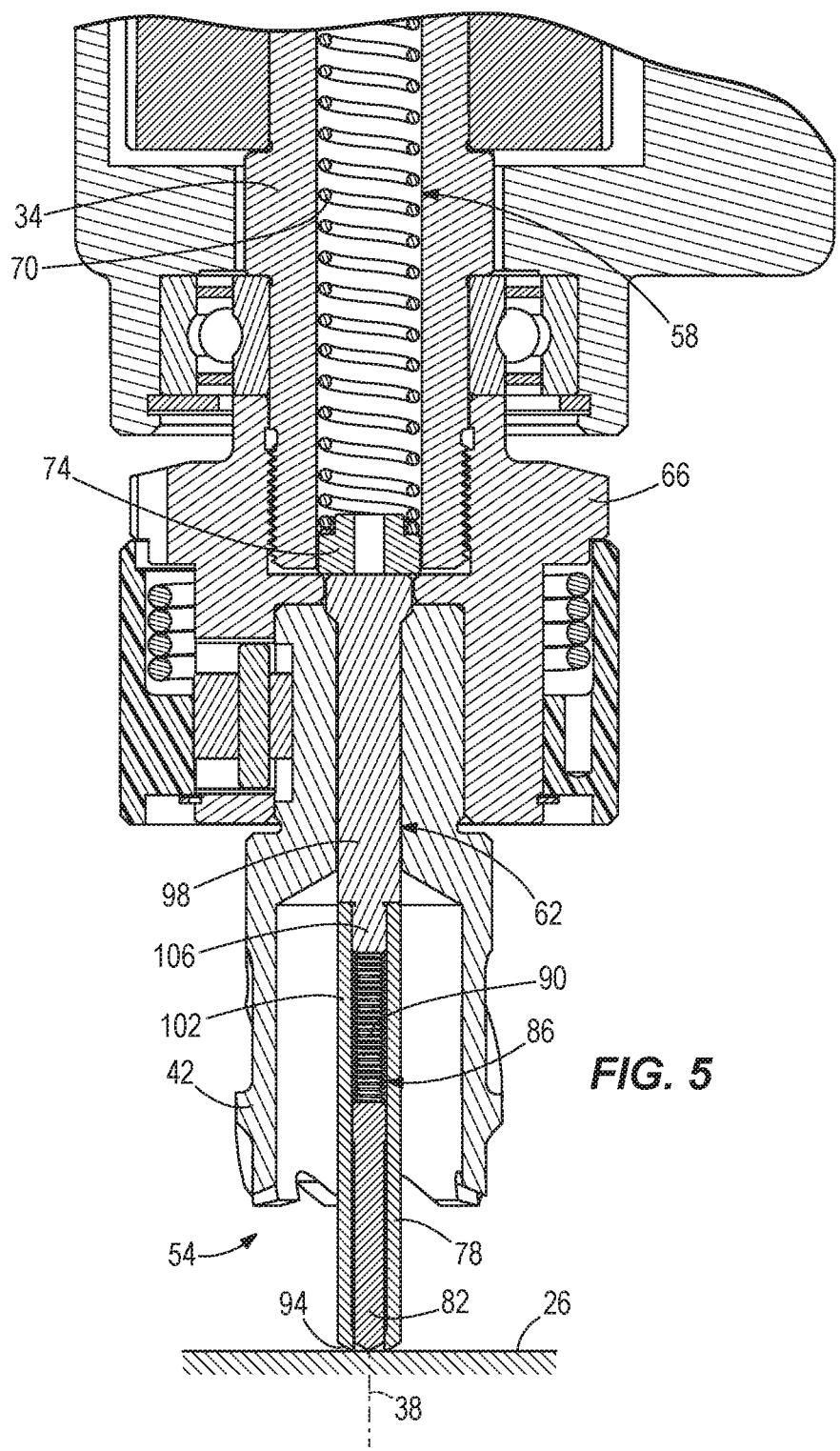
FIG. 5 is a partial cross-sectional view of the magnetic drill press and pilot pin assembly of FIG. 1, illustrating the first pin in an extended position relative to the drill bit and the second pin in a retracted position relative to the first pin.
Figure 6:
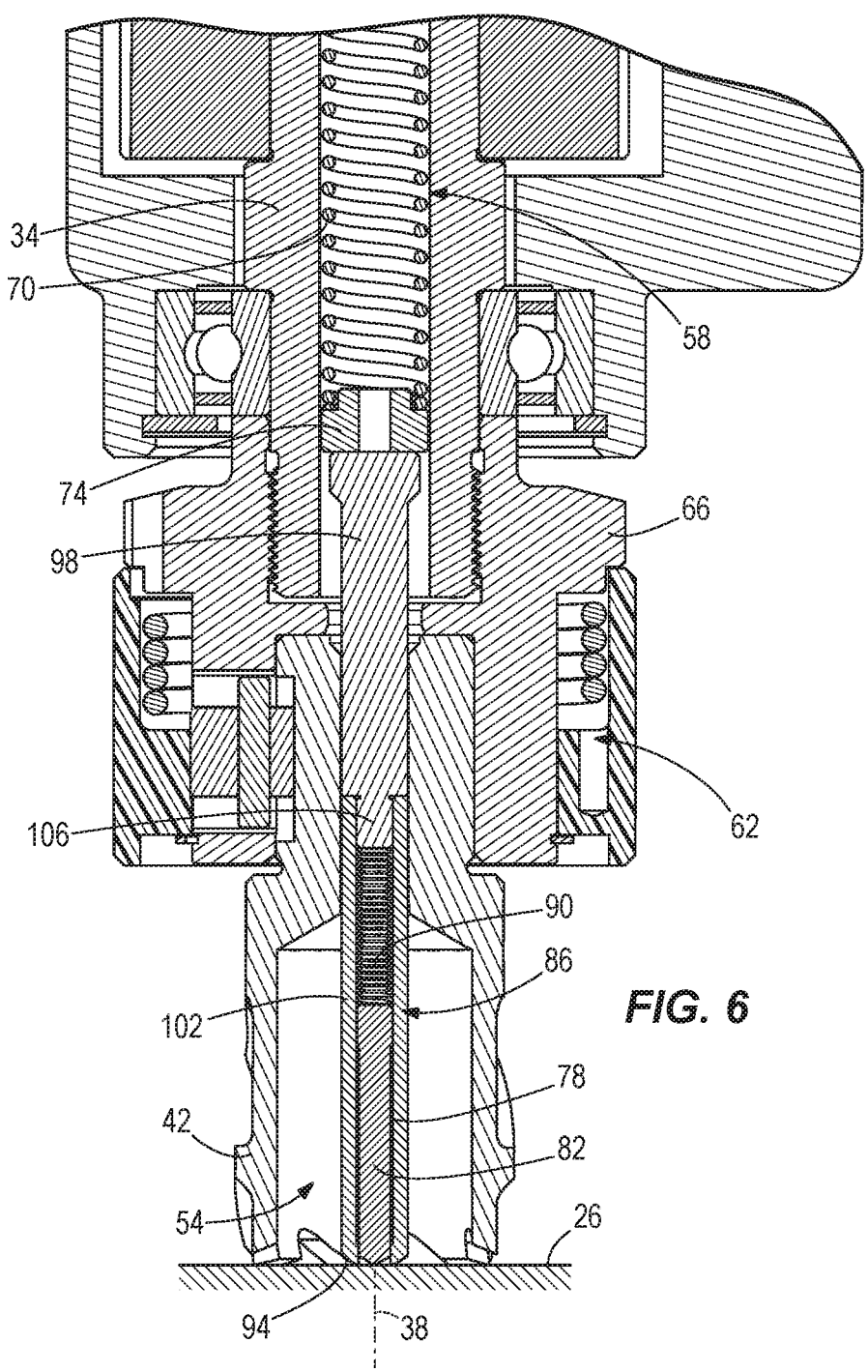
FIG. 6 is a partial cross-sectional view of the magnetic drill press and pilot pin assembly of FIG. 1, illustrating the first pin in a retracted position relative to the drill bit and the second pin in a retracted position relative to the first pin.

FIG. 1 illustrates a magnetic drill press 10 including a drill assembly 14, a drill stand 18 to support the drill assembly 14, and a magnetic base 22 for supporting the drill stand 18 and selectively magnetically latching the magnetic drill press 10 to a ferromagnetic workpiece 26 (shown in FIGS. 4-6). The drill assembly 14 includes a housing 30 and may include a DC motor or an AC motor contained within the housing 30 to rotate a spindle 34 (FIGS. 4-6) about a rotational axis 38. A working tool bit 42 is attached to the spindle 34 for co-rotation therewith. In the illustrated embodiment, the tool bit 42 is configured as a drill bit, but could alternatively be configured as an annular cutter or other accessory for performing work on a workpiece. A handle 46 is provided to allow the user to selectively raise and lower the drill assembly 14 with respect to the drill stand 18 and the workpiece 26. The magnetic drill press 10 may be powered by a battery 50 as shown in the illustrated embodiment, from an AC voltage input (i.e., from a wall outlet), or by an alternative DC voltage input (e.g., a DC power supply).

With continued reference to FIG. 1, the magnetic drill press 10 further includes a pilot pin assembly 54 at least partially extending through the drill bit 42 for providing an indication where the rotational axis 38, and therefore the drill bit 42 when lowered, would intersect the workpiece 26. With reference to FIGS. 4-6, the pilot pin assembly 54 extends through coaxial bores 58, 62 in the spindle 34 and the drill bit 42, respectfully. The drill bit 42 is rotationally secured to the spindle 34 by a chuck 66. The magnetic drill press 10 includes a spring 70 positioned in the bore 58 for biasing the pilot pin assembly 54 outward from the drill bit 42 and toward the workpiece 26. More specifically, in the illustrated embodiment, the magnetic drill press 10 includes a seat 74 positioned within the bore 58 between the spring 70 and the pilot pin assembly 54. In operation of the magnetic drill press 10, as described in more detail below, the seat 74 is slidable within the bore 58 against the bias of the spring 70 in response to the pilot pin assembly 54 being retracted into the drill bit 42 and the spindle 34 as the drill bit 42 is lowered onto and subsequently plunged into the workpiece 26. In other words, the pilot pin assembly 54 is slidably received within the drill bit 42, the chuck 66, and the spindle 34 as the drill bit 42 is lowered onto and subsequently plunged into the workpiece 26.

With reference to FIGS. 2-6, the pilot pin assembly 54 includes a first pin 78 and a second pin 82 telescopically received within the first pin 78. In the illustrated embodiment, the first pin 78 defines an interior cavity 86 and the second pin 78 is at least partially received within the interior cavity 86 of the first pin 78. Alternatively, the pilot pin assembly 54 may be configured such that the second pin 82 includes an interior cavity, and the first pin 78 is at least partially received within the interior cavity of the second pin 82. With reference to FIGS. 3-6, a spring 90 is positioned within the interior cavity 86 for biasing the second pin 82 toward an extended position (shown in FIGS. 2 and 3) relative to the first pin 78. In order to position the spring 90 within the interior cavity 86, the first pin 78 is separated into a shank portion 98 and a tubular portion 102 in which the interior cavity 86 is defined. The shank portion 98 includes a plug 106 that is interference fit with the tubular portion 102 after the spring 90 has been positioned within the interior cavity 86. In this way, the spring 90 is retained within the interior cavity 86 of the first pin 78. In alternative embodiments, the shank portion 98 and the tubular portion 102 of the first pin 78 are unitized with alternative methods (e.g., using threads, adhesives, welding, etc.). The second pin 82 is movable against the bias of the spring 90 from the extended position to a retracted position (shown in FIGS. 5 and 6). When the second pin 82 is in the retracted position, a greater length of the second pin 82 is contained within the interior cavity 86 of the first pin 78 when compared to the length of the second pin 82 contained within the interior cavity 86 in the extended position. In addition, the first pin 78 defines an outer periphery 94 and when in the retracted position (FIG. 5), no portion of the second pin 82 protrudes from the outer periphery 94 of the first pin 78.

With reference to FIGS. 4-6, the pilot pin assembly 54 is operable to assume at least three different configurations during a drilling operation in which the drill bit 42 is lowered toward the workpiece 26. The pilot pin assembly 54 assumes a first configuration (FIG. 4) in which both of the first and second pins 78, 82 are in an extended position relative to the drill bit 42 when neither the pilot pin assembly 54 nor the drill bit 42 are in contact with the workpiece 26. Likewise, the pilot pin assembly 54 assumes a second configuration (FIG. 5) in which the first pin 78 is in the extended position and the second pin 82 is in the retracted position relative to the first pin 78 when only the second pin 82 is in contact with the workpiece 26. Finally, the pilot pin assembly 54 assumes a third configuration (FIG. 6) in which the first pin 78 is in a retracted position relative to the drill bit 42 and the second pin 82 is in the retracted position relative to the first pin 78 when the drill bit 42 is in contact with the workpiece 26.

In operation, as the drill bit 42 is lowered onto the workpiece 26, the pilot pin assembly 54 transitions from the first configuration (FIG. 4) to the second configuration (FIG. 5) to the third configuration in sequence (FIG. 6). In the transition between the first configuration and the second configuration, the second pin 82 contacts the workpiece 26 and provides an indication to the user where the rotational axis 38 of the spindle 34 and drill bit 42 intersects the workpiece 26. As a result, the user can confirm that the drill bit 42 is aligned with a desired location on the workpiece 26 without fully lowering the drill bit 42 to contact the workpiece 26. As the drill bit 42 is raised from the workpiece 26, the pilot pin assembly 54 transitions from the third configuration (FIG. 6) to the second configuration (FIG. 5) to the first configuration (FIG. 4). Alternatively, rather than the pilot pin assembly 54 transitioning from the first configuration to the third configuration in sequence, the second pin 82 may retract into the first pin 78 and the pilot pin assembly 54 may retract into the drill bit 42 simultaneously. The pilot pin assembly 54 may alternatively transition from the third configuration back to the first configuration in the same manner.

Various features and advantages of the invention are set forth in the following claims.

What is claimed is:

1. A pilot pin assembly, the pilot pin assembly comprising: a tool bit of a drill press;
   a first pin defining an interior cavity;
   a second pin at least partially received within the interior cavity wherein the first pin is slidably receivable within the tool bit of the drill press of the first pin; and
   a spring positioned within the interior cavity for biasing the second pin toward an extended position relative to the first pin.

2. The pilot pin assembly of claim 1, wherein the second pin is movable against the bias of the spring from the extended position to a retracted position.

3. The pilot pin assembly of claim 2, wherein in the retracted position, a greater length of the second pin is contained within the interior cavity of the first pin compared to the extended position.

4. A magnetic drill press operable to perform work on a workpiece with a tool bit, the magnetic drill press comprising:
   a base attachable to the workpiece;
   a housing supported by the base;
   a motor positioned within the housing;
   a spindle coupled to the motor for rotation about a rotational axis, the tool bit being attachable to the spindle for co-rotation therewith; and
   a pilot pin assembly at least partially extending through the tool bit for providing an indication where the rotational axis intersects the workpiece, the pilot pin assembly including a first pin and a second pin telescopically received within the first pin.

5. The magnetic drill press of claim 4, wherein the second pin is movable between an extended position and a retracted position relative to the first pin.

6. The magnetic drill press of claim 5, wherein the first pin defines an interior cavity, and wherein in the retracted position, a greater length of the second pin is contained within the interior cavity of the first pin compared to the extended position.

7. The magnetic drill press of claim 6, wherein the pilot pin assembly further includes a spring positioned within the interior cavity for biasing the second pin toward the extended position.

8. The magnetic drill press of claim 7, wherein the second pin is movable against the bias of the spring from the extended position to the retracted position.

9. The magnetic drill press of claim 5, wherein the first pin defines an outer periphery, and wherein no portion of the second pin protrudes from the outer periphery of the first pin when in the retracted position.

10. The magnetic drill press of claim 4, wherein the pilot pin assembly assumes a first configuration in which both of the first and second pins are in an extended position relative to the tool bit when neither the pilot pin assembly nor the tool bit are in contact with the workpiece.

11. The magnetic drill press of claim 10, wherein the pilot pin assembly assumes a second configuration in which the first pin is in the extended position and the second pin is in a retracted position relative to the first pin when only the second pin is in contact with the workpiece.

12. The magnetic drill press of claim 11, wherein the pilot pin assembly assumes a third configuration in which the first pin is in a retracted position relative to the tool bit and the second pin is in the retracted position relative to the first pin when the tool bit is in contact with the workpiece.

13. The magnetic drill press of claim 12, wherein the pilot pin assembly transitions from the first configuration to the second configuration to the third configuration in sequence as the tool bit is lowered onto the workpiece.

14. The magnetic drill press of claim 12, wherein the pilot pin assembly transitions from the third configuration to the second configuration to the first configuration in sequence as the tool bit is raised from the workpiece.

15. The magnetic drill press of claim 12, wherein the spindle includes a bore coaxial with the rotational axis, and wherein the first pin is received within the bore only when the pilot pin assembly assumes the third configuration.

16. The magnetic drill press of claim 11, wherein the spindle includes a bore coaxial with the rotational axis, and wherein the first pin is positioned outside the bore when the pilot pin assembly assumes the second configuration.

17. The magnetic drill press of claim 4, wherein the first pin includes a shank portion and a tubular portion interference fit to the shank portion.

* * * * *